United States Patent
Li et al.

(10) Patent No.: US 8,670,434 B2
(45) Date of Patent: Mar. 11, 2014

(54) DYNAMIC CTA ADJUSTMENT ACROSS SUPERFRAMES IN A WIRELESS NETWORK

(75) Inventors: Guoqing C. Li, Portland, OR (US); Carlos Cordeiro, Portland, OR (US)

(73) Assignee: Intel Corporation, Santa Clara, CA (US)

(*) Notice: Subject to any disclaimer, the term of this patent is extended or adjusted under 35 U.S.C. 154(b) by 405 days.

(21) Appl. No.: 12/317,140

(22) Filed: Dec. 19, 2008

(65) Prior Publication Data
US 2010/0157952 A1    Jun. 24, 2010

(51) Int. Cl.
*H04J 3/16*    (2006.01)

(52) U.S. Cl.
USPC .......................................... 370/348

(58) Field of Classification Search
USPC ............................ 370/235, 316, 390; 709/226
See application file for complete search history.

(56) References Cited

U.S. PATENT DOCUMENTS

| | | | |
|---|---|---|---|
| 2003/0031141 A1* | 2/2003 | Schweinhart et al. | 370/316 |
| 2003/0152059 A1 | 8/2003 | Odman | |
| 2007/0002743 A1* | 1/2007 | Fan | 370/235 |
| 2007/0280237 A1* | 12/2007 | Shin et al. | 370/390 |
| 2009/0138598 A1* | 5/2009 | Shrivastava et al. | 709/226 |

FOREIGN PATENT DOCUMENTS

| | | |
|---|---|---|
| JP | 2003-060564 | 2/2003 |
| WO | 2007142459 | 12/2007 |
| WO | 2008/126958 A1 | 10/2008 |

OTHER PUBLICATIONS

Draft Standard for Telecommunications and Information Exchange Between Systems—LAN/MAN Specific Requirements—Part 15.3: Wireless Medium Access Control (MAC) and Physical Layer (PHY) Specifications for High Rate Wireless Personal Area Networks (WPAN), Draft P802.15.3/D17, Feb. 2003, pp. 145-148 and 187-195.*
"IEEE Standard for Information Technology—Telecommunications and Information Exchange Between Systems—Local and Metropolitan Area Networks—Specific Requirements Part 15.3: Wireless Medium Access Control (MAC) and Physical Layer (PHY) Specifications for High Rate Wireless Personal Area Networks (WPANs)", IEEE Std 802.15.3TM-2003, Sep. 29, 2003, 324 pages.
European Search Report received for European Patent Application No. 09252784.5, mailed on Jan. 20, 2011, 5 pages.
Office Action received for Japanese Patent Application No. 2009-283932, mailed Oct. 2, 2012, 6 pages including 3 pages English translation.

* cited by examiner

*Primary Examiner* — Joseph Bednash
(74) *Attorney, Agent, or Firm* — Kacvinsky Daisak PLLC

(57) ABSTRACT

In a wireless communications network, various embodiments of the invention provide a technique for requesting an extension or truncation of the previously assigned channel time allocation (CTA), and extending that extension or truncation across multiple superframes without having to make further requests. The request may be made by transmitting an Information Element (IE) that indicates how many superframes the request applies to.

18 Claims, 6 Drawing Sheets

DYNAMIC CTA ADJUSTMENT ACROSS SUPERFRAMES IN A WIRELESS NETWORK

BACKGROUND

Some types of wireless communications are very bursty in nature, i.e., the volume of data to be transferred, and the amount of data to be transferred per unit of time, may vary widely. Some types of data also have short latency requirements (e.g., interactive streaming video data), so that delays in transferring that data can have undesirable effects. Managing all these requirements at the same time can be difficult when allocating channel time to multiple devices in a network. To partially address this issue, a capability has been defined to provide for requesting an extension or a truncation of a device's currently assigned channel time allocation (CTA) if it turns out that the currently assigned CTA provides either too little time, or more time than is needed, to perform the necessary transmissions. If the device still has unused time after its transmissions are complete, it can transmit a truncation message to give that unused channel time back for possible reallocation to another device. Similarly, if the device is going to need more time than it has been allocated, it can transmit an extension message to request that its current CTA be extended, if such time is available on the channel. However, these requests only allow a device to extend or truncate within the current superframe. When the next superframe occurs, the device has to request the extension or truncation again. This can result in excessive overhead, which can reduce overall throughput.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
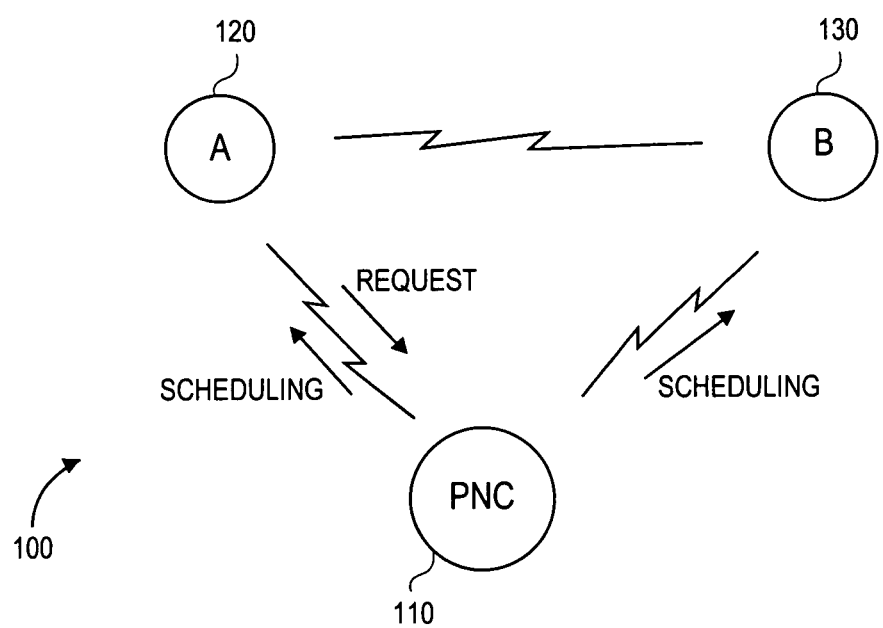
FIG. 1 shows some of the devices in a wireless communications network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing, transmitting, and/or receiving information in a form readable by one or more computers. For example, a computer-readable medium may include a tangible storage medium, such as but not limited to read only memory (ROM); random access memory (RAM); magnetic disk storage media; optical storage media; a flash memory device, etc. A computer-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not.

Various embodiments of the invention provide a technique for requesting a CTA extension or truncation that extends across multiple superframes in a wireless communications network, without the request having to be repeated for each of the multiple superframes. In some embodiments the request may be made by transmitting an Information Element (IE) which contains fields indicating how many superframes the request applies to.

FIG. 1 shows some of the devices in a wireless communications network, according to an embodiment of the invention. The illustrated network 100 may contain a network controller 110 (PNC), and network devices 120(A) and 130 (B). Within the context of this document, the term "network controller" will indicate a device that schedules communications by other devices in the wireless network by assigning channel time allocations to those other devices, while the term "network device" will indicate a device whose wireless communications are scheduled by receiving its channel time allocation from the network controller. Only two network devices are shown, but other embodiments may contain one, three, or more such devices, and that quantity may change dynamically as network devices are introduced into, or removed from, the network. The network controller 110 in this example is labeled as a piconet controller (PNC), because the techniques described herein should be especially beneficial in piconets, but other types of networks and network controllers may also be encompassed by these descriptions. In network 100, the network controller 110 may schedule communications between network devices 120(A) and 130 (B), and also between itself and each of network devices 120 and 130. In particular, the network controller 110 may assign specific periods of channel time allocation (CTA) for communications between network devices 120 and 130, between network device 120 and the network controller 110, and between network device 130 and the network controller 110, and transmit that scheduling information to each of network devices 120 and 130 so that they know when to engage in such communications. Such CTA assignments may be made based on an estimate of the time that will be required for such communications.

However, these estimates may not always be accurate. During such a communication, a network device (e.g., device 120) may determine that it needs more or less time than was allocated for its CTA, and may transmit a request to the network controller 110 to either extend the allocated time, or to reduce (truncate) the allocated time. If more time is requested, and the network controller 110 determines that the extra time is available on the channel, it may grant an extension to the CTA for the requesting device 120. If less time is requested, the network controller may shorten the CTA and grant the unused time to another network device in the network. Conventional techniques only apply these requests and grants to the current superframe, so if a device determines that the adjustment in CTA would be useful in the following superframes, it will have to repeat that request in each of those following superframes. However, the requests described herein may request that the extension or truncation be applied to multiple superframes.

Figure 2:
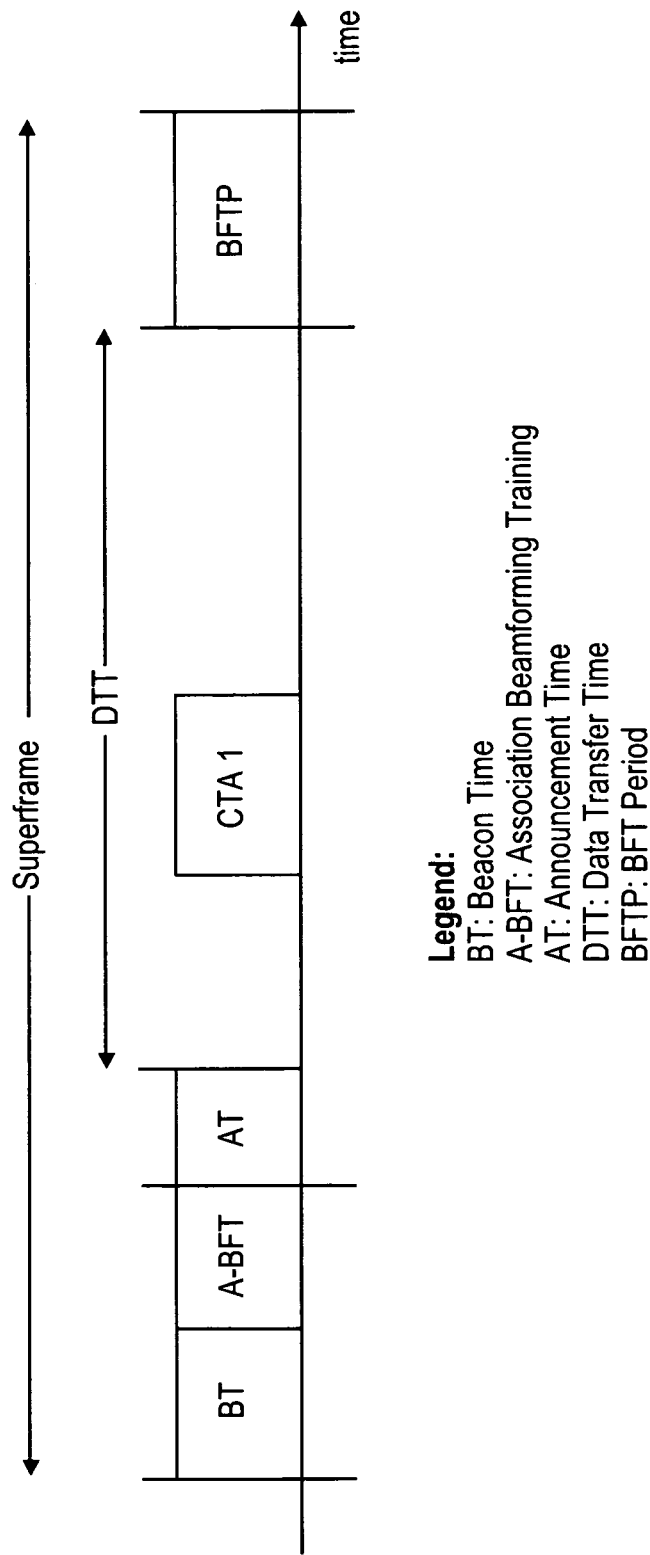
FIG. 2 shows some of the contents of a superframe, according to an embodiment of the invention.

FIG. 2 shows some of the contents of a superframe, according to an embodiment of the invention. In a typical network, these superframes may be scheduled continually, although their contents may vary somewhat over time. Although the illustrated embodiment shows specific fields in a specific order, other embodiments may have somewhat different fields, and/or place the fields in a different order than shown. In the illustrated example, the first part of the superframe may be devoted to beacon time (BT), in which the network controller 110 transmits one or more beacons, and various devices may respond to the beacons. A typical beacon may contain timing information that allows the network devices to synchronize their network clocks, and it may also contain an invitation for unassociated devices to announce their presence and potentially join the network.

The association beam forming training (A-BFT) period may be used for newly-joined devices to "train" their directional signals, so that their subsequent directional transmissions and receptions will be pointed in the right directions, and with sufficiently narrow beams. Such directional communication may be important in some networks, due to the physical proximity of many devices that might otherwise interfere with each other.

The announcement time (AT) period may be used to communicate general purpose information within the network. The beamforming training period (BFTP) at the end of the superframe may be used to permit existing devices in the network to retrain, or fine-tune, their directional signals. Such retraining may be needed for various reasons, such as the physical movement of a device within the network.

The data transfer time (DTT) may be used for the various devices in the network to communicate information to each other, and is the portion of the superframe in which the CTAs, including requests for extension or truncation of those CTA's, are located. Multiple CTA's may be located within the DTT period, although for clarity only a single one is shown. Each CTA represents the time that is scheduled for the device in question to communicate with one or more other devices. However, during a given CTA period, the transmitting device 120 may also transmit a request to the network controller 110 to adjust the remaining time in the CTA. If the requesting network device 120 determines that it would be useful to also apply this adjustment to the following superframes, the request may contain an indication of how many subsequent superframes should contain this adjusted CTA time. If the request is granted, the network controller 110 may transmit a notification of this grant back to the requesting network device 120.

Figure 3:
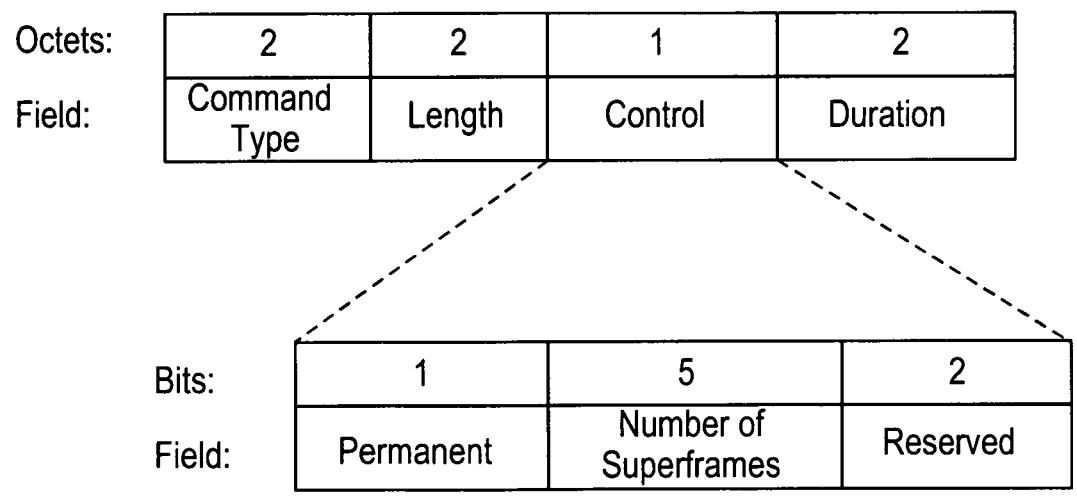
FIG. 3 shows an information element (IE) containing information to request a CTA adjustment, according to an embodiment of the invention.

FIG. 3 shows an information element (IE) containing information to request a CTA adjustment, according to an embodiment of the invention. IE's may be used in wireless communications to convey various different types of information, and may typically be found in specific parts of the protocol that is being used. The example shows various fields that may be included in this IE, and the size of each field in octets (8 bits each). The first two fields (Command Type and Length) have been standardized in the industry, although subsequent changes to the standards may alter the size and/or purpose of standardized fields in IE's. The remaining fields may be customized for the purposes described here. A particular example is shown, but other embodiments may use different fields and/or different field sizes than those that are shown.

In the illustrated embodiment, the Command Type field may specify what type of IE this is, and in particular may specify that this is a request to adjust the CTA duration. In one embodiment, a particular value in this field will specify that this is a request to extend the CTA, and another particular value in this field will specify that this is a request to truncate the CTA. The Length field indicates the length of this IE, so that the receiving device will know where this IE ends and the next field in the transmission begins.

The Duration field may indicate the amount of extension or truncation being requested. This value may be expressed in any suitable units, such as but not limited to: 1) units of absolute time, 2) units of clock cycles, 3) OFDMA symbols, 4) etc. In one embodiment the Duration field may indicate the amount of adjustment to the CTA duration that is being requested, while in another embodiment the Duration field may indicate the total requested length of the CTA after the adjustment is made. In still another embodiment, the Duration field may indicate whether the amount of adjustment is to be added to (extension) or subtracted from (truncation) the existing duration. This might be accomplished, for example, by using a signed number format in the Duration field. This technique may avoid the need for two different commands in the Command field to indicate adjusting the CTA.

The Control field may indicate how many consecutive superframes the requested CTA adjustment is to be applied to. Note that the same adjustment is to be made to each of the indicated CTA's in the indicated superframes. In the format shown, a single bit may indicate whether or not the adjustment is to be made permanent, with the term 'permanent' meaning the change will not automatically expire, but rather will be applied until specifically changed to another value. If the change is not indicated as being permanent, the Number of Superframes field may indicate how many consecutive superframes the change will be applied to before the CTA length reverts back to its previous value or is otherwise changed. In one embodiment, the value '0' in this field indicates it only applies to the current superframe, the value '1' indicates it only applies to the current and the next superframe, the value '2' indicates it only applies to the current and the next two superframes, etc. In another embodiment, the value '1' indicates it only applies to the current superframe, the value '2' indicates it only applies to the current and the next superframe, the value '3' indicates it only applies to the current and next two superframes, etc. In some embodiments, the value '0' in this field may indicate that the request is permanent, eliminating the need for a separate Permanent field in the IE.

Figure 4:
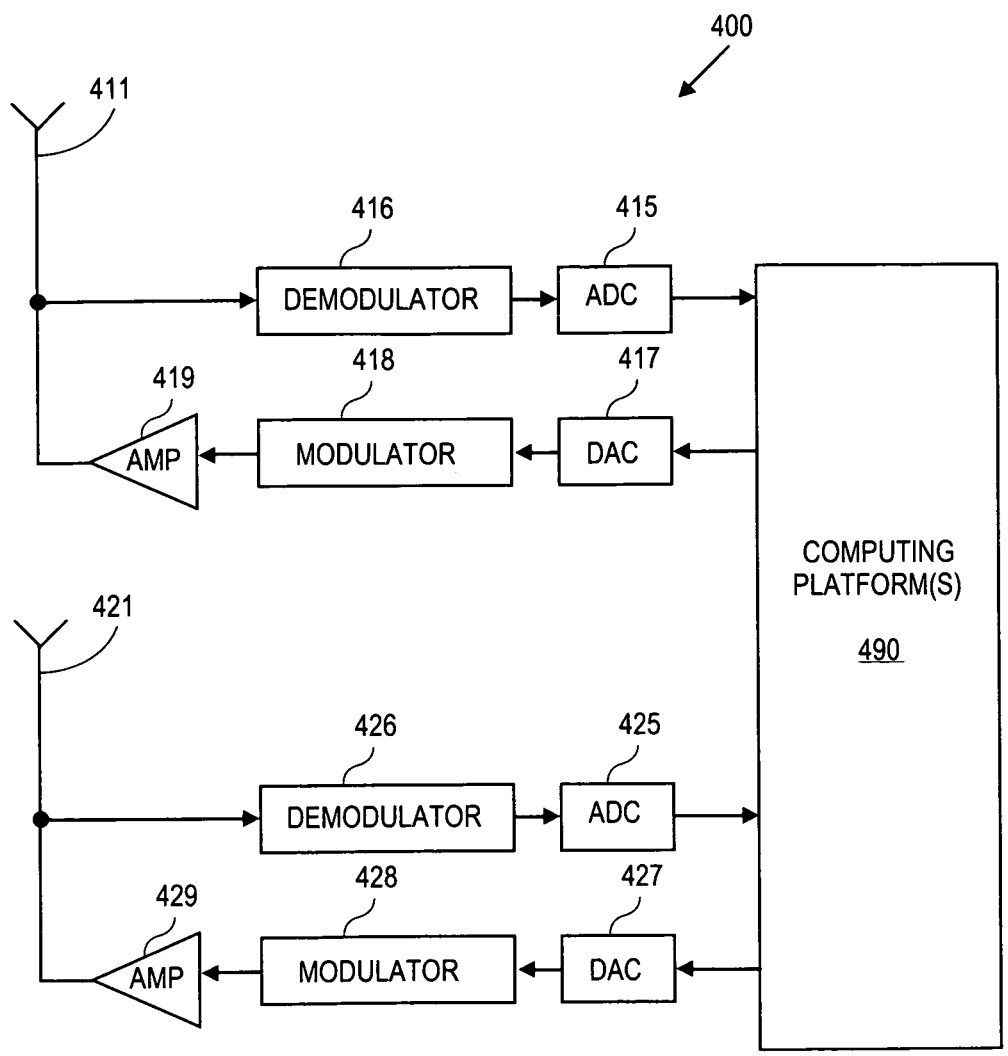
FIG. 4 shows a diagram of a wireless communications device, according to an embodiment of the invention.

FIG. 4 shows a diagram of a wireless communications device, according to an embodiment of the invention. Any of the aforementioned devices 110, 120, or 130 may contain some or all of the components shown in illustrated device 400. For example, one or more computing platforms 490 may be used to control overall operations of the device 400. A computing platform may contain one or more processors, including an applications processor and/or a digital signal processor. This particular embodiment shows two antennas 411 and 421, but other embodiments may contain one, three, or more antennas, each with necessary supporting components. In this example, antenna 411 is coupled to a demodulator 416 to demodulate the received signal and convert it to a baseband signal. The baseband signal may then be converted to digital format with analog-to-digital converter (ADC) 415. For transmissions, digital signals may be converted to analog with digital-to-analog converter (DAC) 417. The analog signals may then be modulated onto a radio frequency (RF) carrier wave through modulator 418, and then amplified in power amp 419 for transmission through antenna 411.

Similar functionality may be provided for antenna 421 by demodulator 426, ADC 425, DAC 427, modulator 428, and amplifier 429. FIG. 4 shows one embodiment of a configuration of a wireless communications device, but other embodiments may use different components, and/or may arrange components in a different manner than shown.

Figure 5:
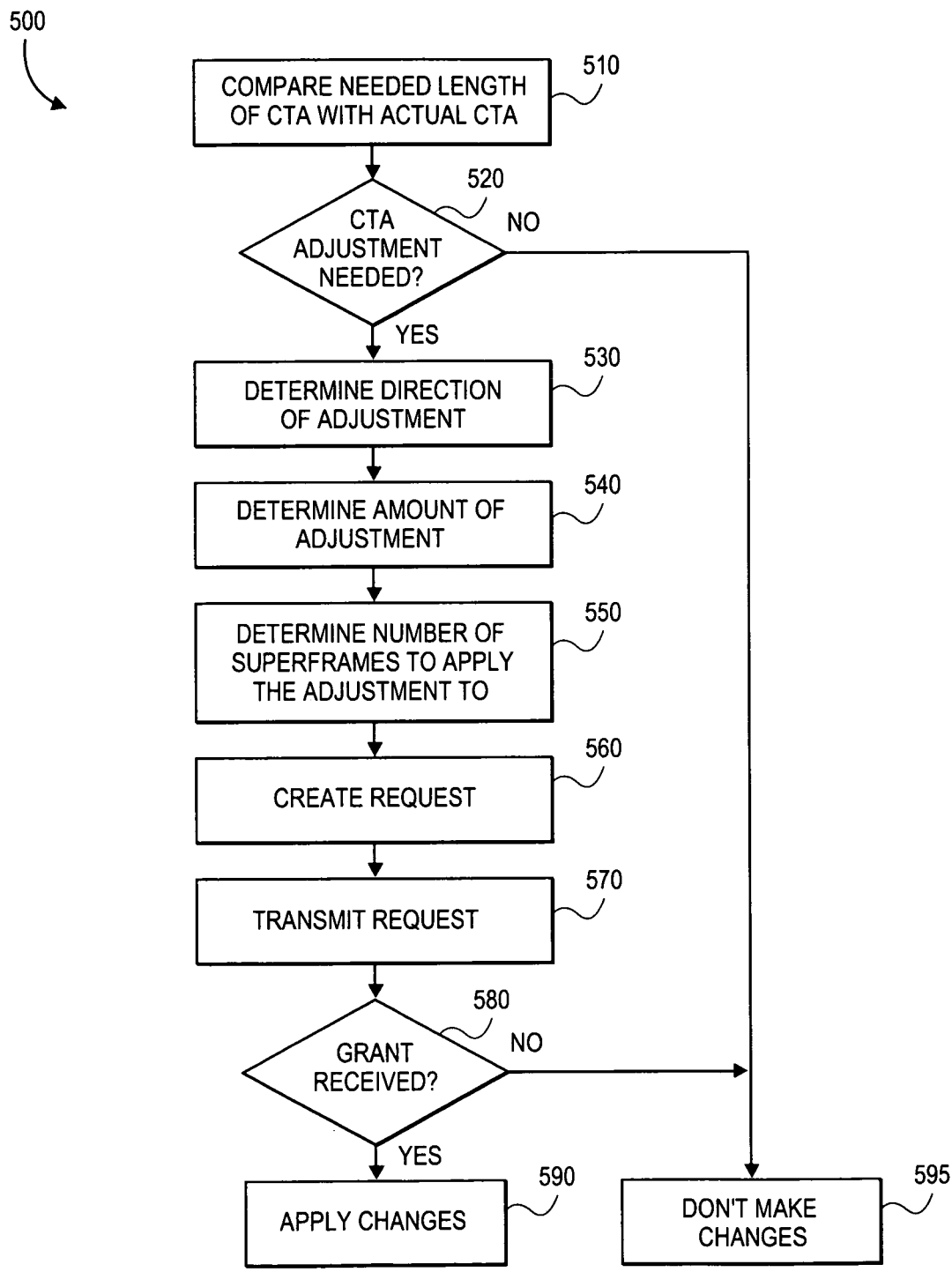
FIG. 5 shows a flow diagram of a method of requesting an adjustment to a CTA that extends to multiple superframes, according to an embodiment of the invention.

FIG. 5 shows a flow diagram of a method of requesting an adjustment to a CTA that extends to multiple superframes, according to an embodiment of the invention. This method may be performed by a device in the network that is not the network controller, for example by device 120 or 130 in FIG. 1. In flow diagram 500, at 510 a wireless communications device that is communicating during a pre-assigned CTA may compare the actual length of the CTA with the length of CTA that the device needs in order to better perform its intended communications. If there is a sufficient difference between the two, the device may determine at 520 that the length of the CTA should be adjusted. Various criteria may be used to determine that such an adjustment is needed, such as but not limited to: 1) the actual and needed CTA's differ by more than a particular percentage, 2) the actual and needed CTA's differ by more than a particular amount of time, 3) the actual and needed CTA's differ by more than a variable value that is derived from the ongoing communications environment, 4) a combination of factors, 5) etc.

If no change in CTA is needed, then the flow diagram may go to 595. However, if the need for a change is determined at 520, then the device may determine three values that will be in the request for such a change: the direction of adjustment (increase or decrease the CTA) as determined at 530, the amount of the adjustment as determined at 540, and the number of superframes that this change should be applied to, as determined at 550. At 560 the request for such a change may be created. In some embodiments this request may be in the form of an IE, such as but not limited to an IE with a format like, or similar to, the one in FIG. 3. This request may then be transmitted to the network controller at 570.

Whether or not the request is granted may be determined by the network controller. If the network controller notifies the requesting device that the request has been granted, as determined at 580, then the requesting device may apply those changes to its own communications schedule at 590. For example, if an extension to the CTA for a certain number of superframes has been granted, the requesting device may continue to communicate during the current extended CTA for the extended amount of time, and may also communicate for the extended CTA time in the designated future superframes. Alternately, if a reduced value of CTA has been requested and granted for a certain number of superframes, then the requesting device may limit its communications time to conform to the truncated CTA for the designated number of superframes.

Of course, if the request is not granted by the-network controller, as determined at 580, then such changes will not be made at 595, and the assigned CTA length may continue in the current and future superframes until changed by some other action.

Figure 6:
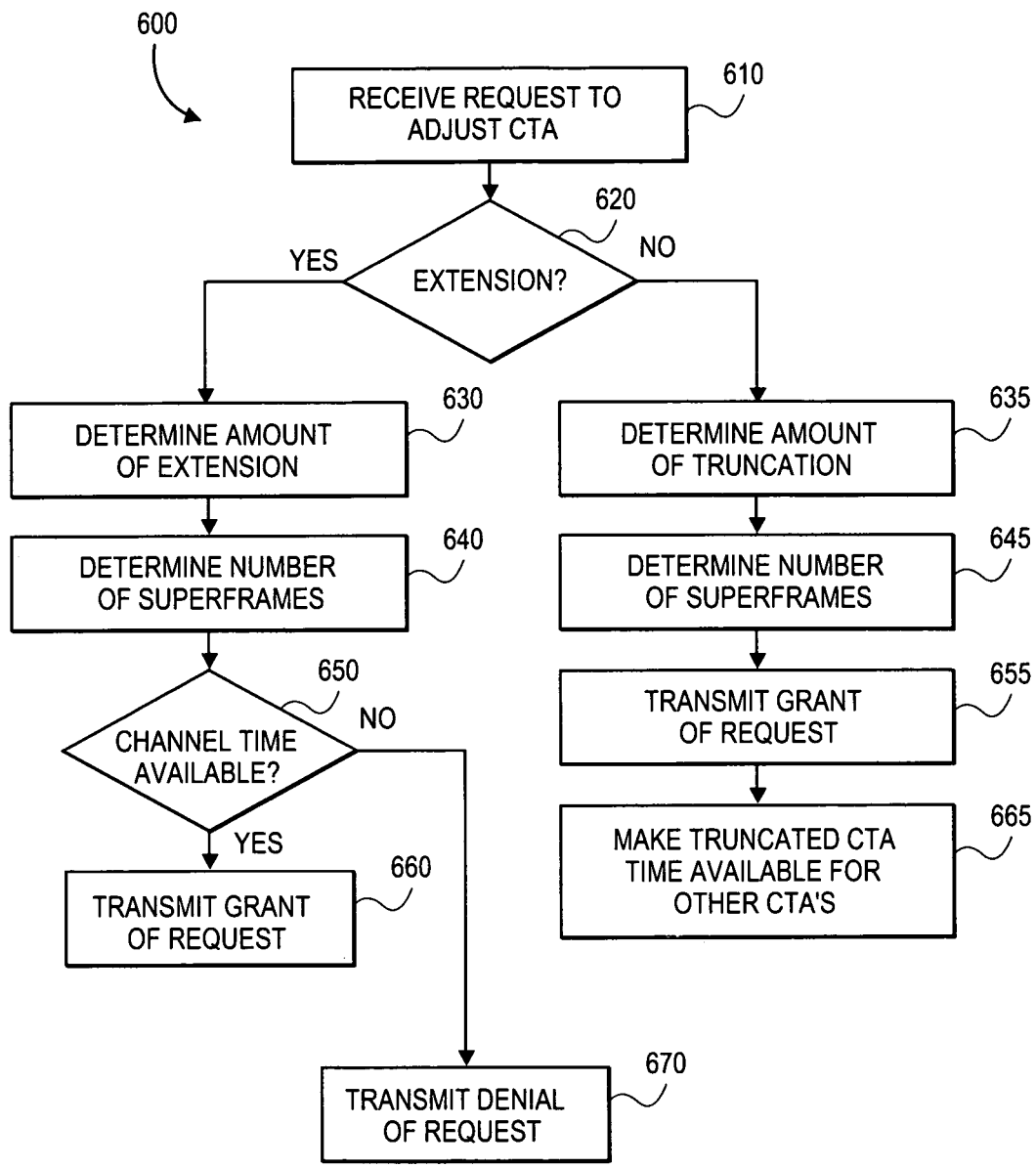
FIG. 6 shows a flow diagram of a method of receiving a request for an adjustment to a CTA that extends to multiple superframes, according to an embodiment of the invention.

FIG. 6 shows a flow diagram of a method of receiving a request for an adjustment to a CTA that extends to multiple superframes, according to an embodiment of the invention. This method may be performed by the network controller in the network, such as by device 110 in FIG. 1. In flow diagram 600, at 610 the network controller may receive a request from a network device to change the length of the assigned CTA for that device.

If the request involves an extension of the CTA, as determined at 620, the network controller may determine the amount of the requested extension at 630 and the number of superframes that the extension should be applied to at 640. After examining the currently assigned CTA's for other devices in the network, the network controller may determine at 650 whether granting this extension is feasible. For example, granting the extension might cause potential interference within the network if the extended CTA would overlap another CTA that was already assigned to another network device. There may be other reasons that granting the extension would not be desirable, but all those reasons are collectively shown at 650 as deciding whether non-interfering channel time for the extension is available to the requesting device. This decision may be based not just on CTA assignments during the current superframe, but also for CTA assignments for each of the superframes covered by the request.

If the channel time is not available, as determined at 650, or if the request is to be denied for other reasons, the network controller may transmit a message to the requesting device at 670, indicating that the request has been denied. If the channel time is available and the request is to be granted, as determined at 650, the network controller may transmit a message to the requesting device at 660, indicating that the request has been granted. Of course, the network controller may also update its own record of the CTA assignments to reflect these changes, so that any subsequent requests for CTA adjustments may be accurately evaluated.

Returning to 620, if the request is a truncation of the CTA rather than an extension, the amount the CTA is to be reduced may be determined at 635, and the number of superframes the truncation is to be applied to may be determined at 645. Since reducing the length of this CTA should not cause interference with other CTA's, in some embodiments this request may be granted at 655 without the type of comparisons performed at 650. Truncating multiple CTA's in this manner should increase the channel time that other devices might be able to use. Therefore, at 665 this additional time may be made available for other CTA's.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising:
a network controller for a wireless communications network, the network controller having a computing platform, a modulator, and a demodulator, the network controller to:
receive a request from a network device for an adjustment to a channel time allocation (CTA) for multiple superframes indicated in the request, the request having an amount of the adjustment and a number of superframes the adjustment is to be applied to, and the CTA having been assigned to the network device;
transmit a grant of the request to the network device if the request is to be granted; and
automatically revert the CTA to a previous value after processing the number of superframes without receiving another request for an adjustment.

2. The apparatus of claim 1, wherein:
the adjustment comprises an extension to the CTA; and
the network controller is to compare the adjustment with other CTA's assigned to other network devices to determine if the extension will overlap any of said other CTA's.

3. The apparatus of claim 1, wherein the adjustment comprises truncation of the CTA.

4. A method, comprising:
receiving a request from a wireless communications device to adjust a length of a channel time allocation (CTA) for multiple consecutive superframes indicated in the request from the wireless communications device, the request having an amount of the adjustment and a number of superframes the adjustment is to be applied to;
adjusting the length of the CTA for each of the multiple consecutive superframes indicated in the request; and
automatically reverting the length of the CTA to a previous value after processing the number of superframes without receiving another request to adjust the length of the CTA.

5. The method of claim 4, wherein:
the request comprises a request to extend the length of the CTA; and
the method comprises determining if the extended CTA would overlap in time with other CTA's.

6. The method of claim 4, wherein the request comprises a request to truncate the length of the CTA.

7. An article of manufacture, comprising:
a non-transitory computer-readable medium that contains instructions, which when executed by one or more processors result in performing operations comprising:
receiving a request from a wireless communications device to adjust a length of a channel time allocation (CTA) for multiple consecutive superframes indicated in the request from the wireless communications device, the request having an amount of the adjustment and a number of superframes the adjustment is to be applied to;
transmitting a grant of the request to the wireless communications device; and
automatically reverting the length of the CTA to a previous value after processing the number of superframes without receiving another request for an adjustment.

8. The article of manufacture of claim 7, wherein: the operation of receiving a request comprises receiving a request to extend the length of the CTA; and the operations further comprise determining that the extended CTA would overlap in time with other CTA's.

9. The article of manufacture of claim 7, wherein the operation of receiving a request comprises receiving a request to truncate the length of the CTA.

10. An apparatus, comprising:
a network device for communicating in a wireless communications network, the network device having a computing platform, a modulator, and a demodulator, the network device to:
determine whether an adjustment to a channel time allocation (CTA) is needed in one superframe or multiple superframes;
transmit a request to the network controller to adjust the CTA for multiple superframes, the request having an amount of the adjustment and a number of superframes the adjustment is to be applied to, and the CTA having been assigned to the network device and to automatically revert to a previous value after processing the number of superframes by the network controller without transmitting another request to adjust the CTA; and
receive a grant of the request from the network controller.

11. The apparatus of claim 10, wherein:
the adjustment comprises an extension to the CTA; and
the network device is to use the extended CTA time for each of the superframes indicated in the request, resultant to said receiving the grant.

12. The apparatus of claim 10, wherein: the adjustment comprises truncation of the CTA; and the network device is to limit communications to the truncated CTA for each of the superframes indicated in the request, resultant to said receiving the grant.

13. A method, comprising:
determining whether an adjustment to a channel time allocation (CTA) is needed in one superframe or multiple superframes;
transmitting a request to a wireless network controller to adjust a length of the CTA for multiple consecutive superframes, the request having an amount of the adjustment and a number of superframes the adjustment is to be applied to and the CTA to automatically revert to a previous value after processing the number of superframes by the network controller without transmitting another request to adjust the length of the CTA; and
communicating within the adjusted CTA for each of the multiple consecutive superframes.

14. The method of claim 13, wherein: the request comprises a request to extend the length of the CTA; and the method comprises using the extended CTA for communications in the superframes indicated in the request, resultant to the request being granted by the network controller.

15. The method of claim 13, wherein:
the request comprises a request to truncate the length of the CTA; and
the method comprises limiting communications to the truncated CTA during the superframes indicated in the request, resultant to the request being granted by the network controller.

16. An article of manufacture, comprising:
a non-transitory computer-readable medium that contains instructions, which when executed by one or more processors result in performing operations comprising:

determining whether an adjustment to a channel time allocation (CTA) is needed in one superframe or multiple superframes;

transmitting a request to a wireless network controller to adjust a length of the CTA for multiple consecutive superframes, the request having an amount of the adjustment and a number of superframes the adjustment is to be applied to, and the length of the CTA to automatically revert to a previous value after processing the number of superframes without transmitting another request to adjust the length of the CTA; and communicating within the adjusted length of the CTA for each of the multiple consecutive superframes.

17. The article of manufacture of claim 16, wherein:

the operation of transmitting a request comprises transmitting a request to extend the length of the CTA; and the method comprises using the extended CTA for communications in the superframes indicated in the request, resultant to the request being granted by the network controller.

18. The article of manufacture of claim 16, wherein:

the operation of transmitting a request comprises transmitting a request to truncate the length of the CTA; and the operations further comprise limiting communications to the truncated CTA during the superframes indicated in the request, resultant to the request being granted by the network controller.

* * * * *